Nov. 8, 1938.  E. C. MERRY  2,135,906
AUTOMOTIVE VEHICLE
Filed March 20, 1936  6 Sheets-Sheet 2

Inventor
Edward C. Merry
By Clarence A. O'Brien and Hyman Berman
Attorneys

Nov. 8, 1938.   E. C. MERRY   2,135,906
AUTOMOTIVE VEHICLE
Filed March 20, 1936   6 Sheets-Sheet 3

Inventor
Edward C. Merry

By Clarence A. O'Brien and
Hyman Berman
Attorneys

Nov. 8, 1938.  E. C. MERRY  2,135,906
AUTOMOTIVE VEHICLE
Filed March 20, 1936  6 Sheets-Sheet 4

Inventor
Edward C. Merry
By Clarence A. O'Brien and Hyman Berman
Attorneys

Patented Nov. 8, 1938

2,135,906

UNITED STATES PATENT OFFICE 2,135,906

AUTOMOTIVE VEHICLE

Edward C. Merry, Dickinson, N. Dak., assignor to
J. Vernon Neville, Forsyth, Mont.

Application March 20, 1936, Serial No. 69,969

5 Claims. (Cl. 180—22)

This invention relates in general to motor vehicles, and more particularly to motor vehicles of the larger type adapted to haul heavy loads such as trucks, busses and railroad vehicles.

My invention is applicable to such vehicles of both the unitary frame type and the trailer type, and the truck or truck portion of my motor vehicle, in each instance, as shown, is of the six-wheel type. My invention contemplates both single axle and multiple-axle drive units, and in the case of multiple-axle drive unit, each of the driving wheel assemblies is driven by an independent motor.

It is an object of my invention to provide a motor vehicle of the class described which possesses greater driving power in proportion to the vehicle weight; which has excellent load distribution and which will withstand long continuous usage with reduced maintenance cost, and which may be manufactured or assembled at reduced cost in comparison with competitive vehicles of equal performance.

It is a further object to provide such a motor vehicle of simple, strong construction and one which can be, for the most part, assembled from conventional motor, axle and power transmission units now extensively utilized in truck and bus construction.

It is still further an object to provide motor vehicle construction of the type described which will afford greater safety, maneuverability and better riding qualities.

I provide, in my construction, a number of co-operating mechanisms, all of which contribute to the unitary result of supplying a relatively long vehicle wherein the weight of the load is well distributed, and which has the functions and advantages previously recited. In the multiple-axle drive type I prefer to mount two independent motors of the light truck type on the chassis or frame, one behind the other, whereby the driving shafts of the two driving units can be disposed in more or less parallel relation, and it is not necessary to offset the differentials on the driving axles or to depart from standard construction. I provide simple and efficient means for supplying a draft of air to the radiator of the rearwardly disposed motor. I provide means for equalizing the deflection of the springs for the dual or multiple-axles, so that obstacles and bumps and irregularities in road surfaces may be encountered with the greatest ease in driving. I also provide connections between the chassis frame and the rear multiple-axle unit which permits transverse shifting of said unit relatively to said frame to permit turns to be made easily and with a minimum wear on tires, as well as relieving a large amount of strain on running gear parts.

The foregoing and other objects will be more apparent from the following description made in connection with the accompanying drawings wherein like reference characters refer to similar parts throughout the several views, and in which:—

Fig. 4 is a detail view clearly illustrating the equalizing assembly and with the wheels on the near side removed;

Fig. 5 is a detail view illustrating certain features hereinafter more fully referred to;

Fig. 6 is a sectional view taken substantially on the line 6—6 of Fig. 5;

Fig. 7 is an edge elevational view of a plate and associated parts forming part of the assembly shown in Fig. 5;

Fig. 8 is a plan view of a slide forming part of the assembly shown in Fig. 7 and also showing the ends of the springs secured to the slide;

Fig. 9 is an enlarged fragmentary detail sectional view of the aforementioned assembly and illustrating certain details hereinafter more fully referred to;

Fig. 10 is a perspective view of a stop pin;

Fig. 11 is a perspective view of a rod forming part of the mechanism for shifting the gear shift lever of a pair of transmissions in accordance with the present invention;

Fig. 13 is a vertical sectional view through an air duct hereinafter more fully referred to;

Fig. 14 is a sectional view taken substantially on the line 14—14 of Fig. 13;

Fig. 17 is a fragmentary detail elevational view of a modified form of slide plate and associated parts;

Fig. 20 is a detail view with some parts broken away, showing the driving connection between the auxiliary motor and the auxiliary driving axle of the first described form of the invention shown in Fig. 1.

Figure 1:
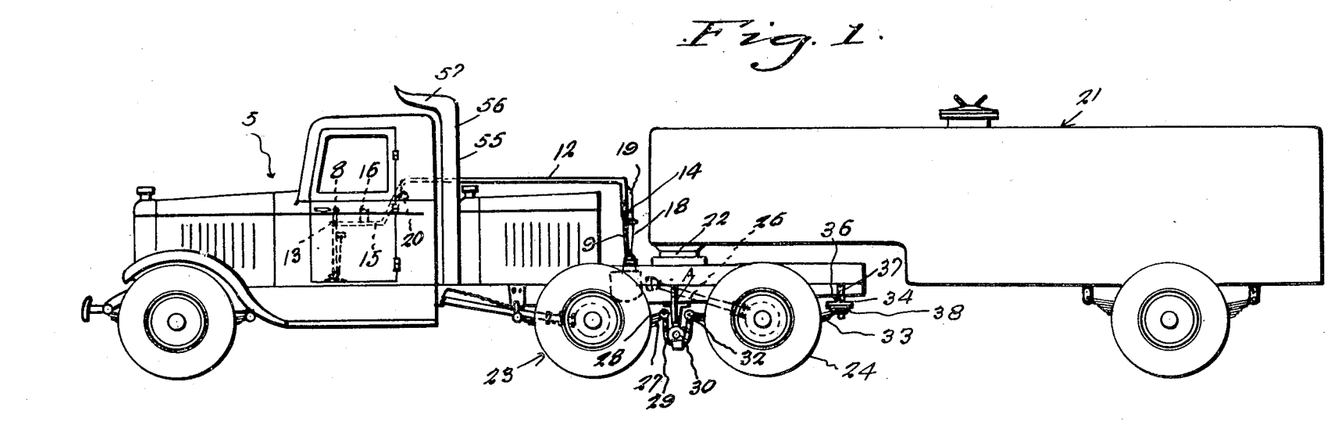
Fig. 1 is a view illustrating application of the invention to a draft and trailer vehicular assembly.

Referring to the drawings wherein like reference numerals refer to corresponding parts throughout the several views, it will be seen that, in accordance with the present invention, I may provide, as shown in Fig. 1, a draft motor vehicle or truck indicated generally by the reference numeral 5.

A motor vehicle or truck of conventional type may be utilized but I prefer to use one of the smaller motor type for the reason that by use of a similar auxiliary motor therewith, I am able to obtain greater driving power upon dual-driving axle assembly in relation to the weight of the motors, transmission mechanisms and frame of the vehicle. In carrying out the form of my invention shown in Fig. 1, the rear part of the body is removed, the entire chassis is utilized and an auxiliary motor, as shown in the form of an internal combustion engine 6, preferably of similar construction and horsepower to the main truck motor 7 (see Fig. 2), is mounted on the frame, as shown, slightly rearwardly of the truck cab.

The controls for the two motors 7 and 6 are connected together for operation by the driver in unison, and to provide for shifting of the levers 8 and 9, (see Fig. 2) of the transmissions 10 and 11, resort is had to a substantially hollow tube 12 preferably arranged as suggested in the drawings and in one end the tube 12 is pivotally connected with the lever 8 as at 13 while at its relatively opposite end the tube 12 is connected with the lever 9 as at 14.

Figure 2:
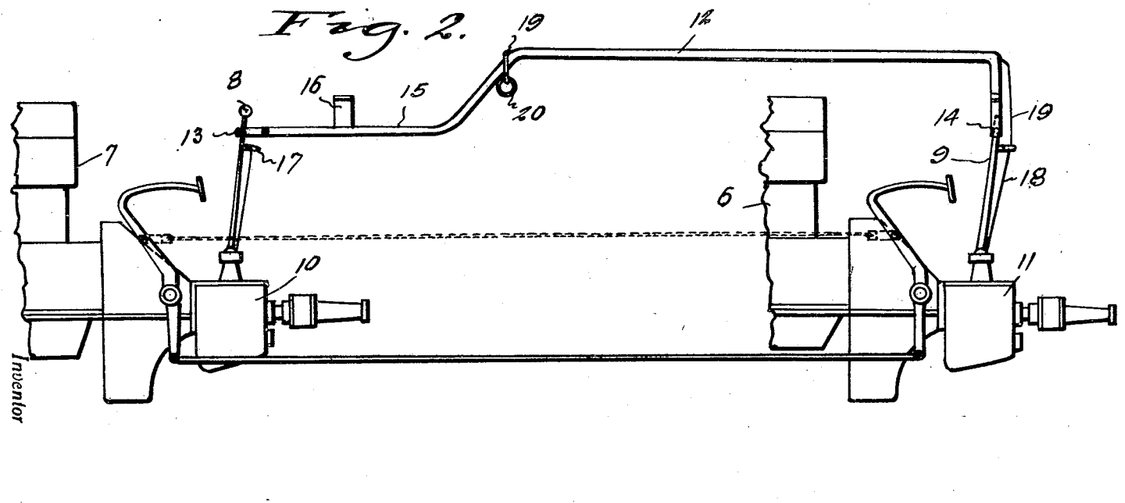
Fig. 2 is a view illustrating somewhat diagrammatically, two speed change transmissions placed remotely from one another.

Adjacent the end thereof connected with the lever 8, the tube 12 is suitably formed as at 15 to provide an arm rest, and this part 15 is also equipped with a spring clip 16 which will straddle the forearm in a manner to hold the forearm in proper position on the tube 12 so that as the gear shift lever 8 is manipulated a corresponding movement will be transmitted to the gear shift lever 9 for placing the transmission 10 and 11 at the same selected forward, or as the case may be, reverse speed.

In motor trucks there is sometimes provided a suitable lock structure indicated generally at 17 which must be released before the gear shift lever, for example the gear shift lever 8 can be manipulated. Where such a lock structure is provided for both the lever 8 and the lever 9, (the lock structure for the lever 9 being herein designated by the reference numeral 18) provision is also made for the simultaneous release of the lock members 17 and 18, this provision in the present instance being in the form of a cable 19 that is clearly shown in Fig. 12, is trained through a part of the tube 12 and at one end is connected with the lock structure 18, as clearly shown in Fig. 2, while at its relatively opposite end the cable 19 is formed with a hand ring or the like, 20, so that the operator may conveniently pull on the cable 19 to release the lock 18 while with his other hand the operator is releasing the lock 17 prior to a manipulation of the gear shift lever 8.

Where a trailer, such for example, as indicated at 21 in Fig. 1 of the drawings, is employed any suitable draft connection 22 may be resorted to as is thought to be apparent.

The driving wheels 23 and driving axle assembly of the draft vehicle or truck 5 are of conventional construction and are connected for driving with the truck motor 7 in the usual manner, no change being necessary in the construction, location or connections of such parts.

Figures 11, 12, 13, 14, 20:
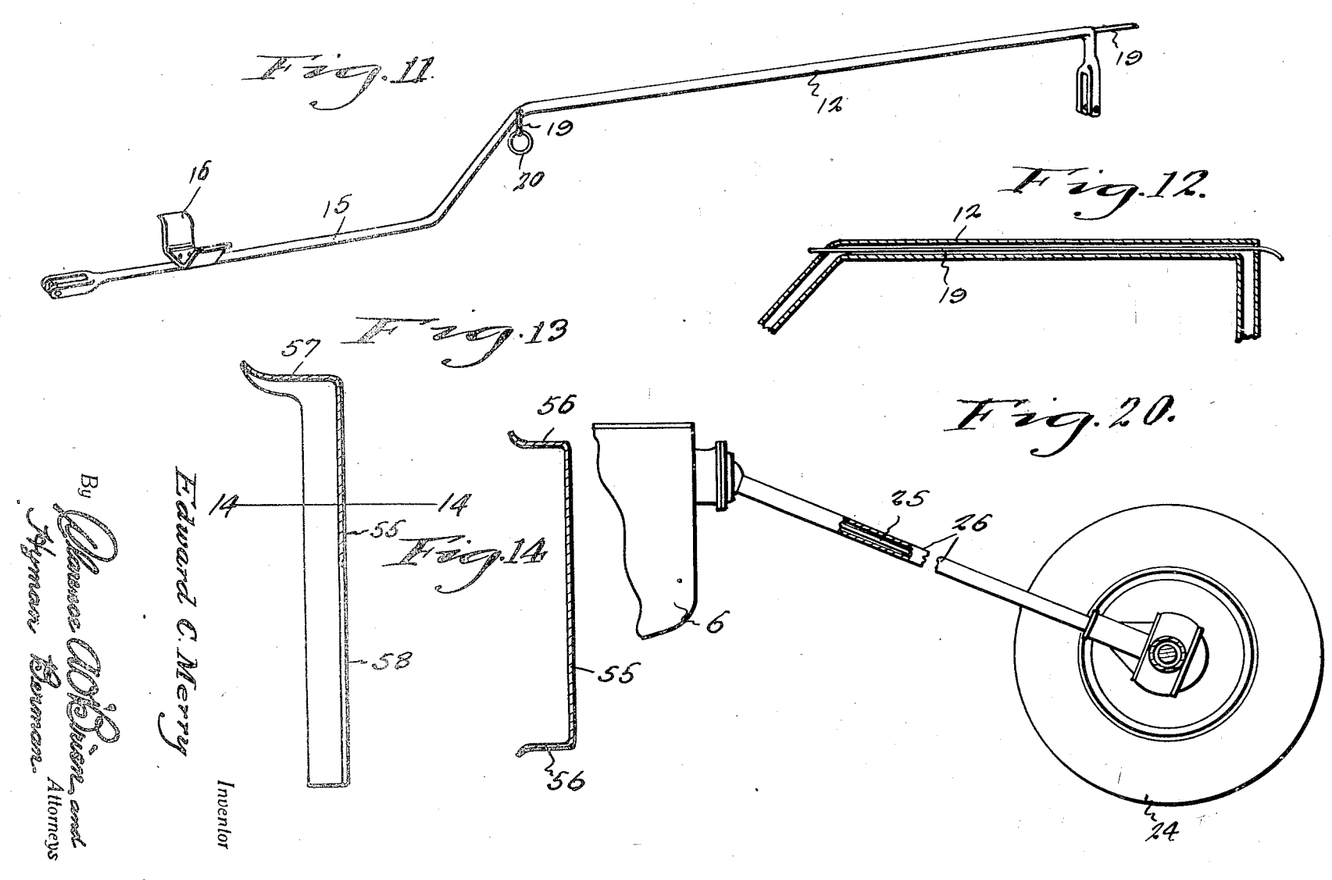
Figure 12:
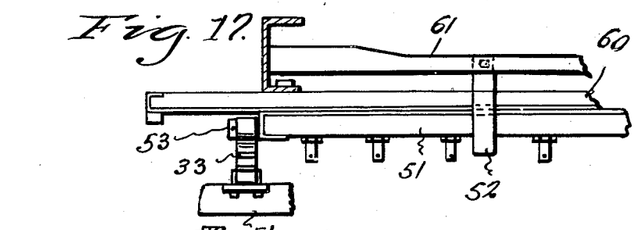
Fig. 12 is a fragmentary detail sectional view through the rod shown in Fig. 11.

Further in the form of the invention shown in Fig. 1, in addition to the rear driving wheels 23 of the foundation truck 5, there is provided rearwardly of the wheels 23 a pair of driving wheels 24 and drive is transmitted from the transmission 11 to the wheels 24 through an axle and differential assembly of usual construction provided for these wheels and also through the medium of a propeller shaft 25 housed within a torque tube 26, as best shown in Fig. 20.

The driving axle assemblies are connected to the frame in the following manner. Springs 27 for the driving wheels 23 are connected to the axle housing in conventional manner. The forward ends of springs 27 are connected with the chassis of the foundation truck in conventional manner, while the rear ends of said springs 27 are each pivotally connected at point 28 to one end of a sprocket chain 29.

Figure 3:
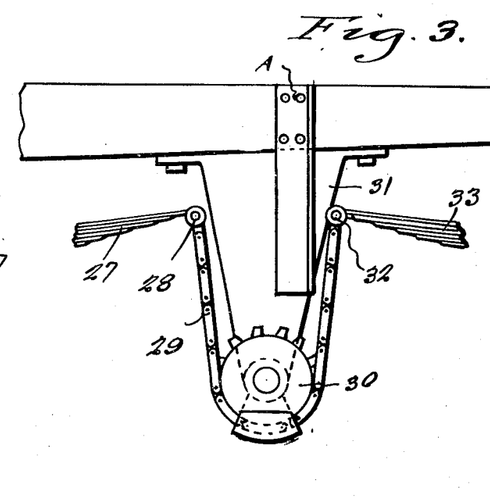
Fig. 3 is a fragmentary detail elevational view of a vehicular spring equalizing assembly.

As clearly shown in Fig. 3 the sprocket chains 29 are trained over sprocket wheels 30 suitably mounted at the lower ends of suspension brackets 31, which depend from opposite sides of the chassis frame of the draft vehicle. The chains 29 are also pivotally connected as at 32 with the forward ends of springs 33 provided for rear wheels 24.

The chains 29 connecting the opposing ends of springs 27 and 33 in co-operation with the sprockets 30 over which the chains are trained, constitute equalizing mechanism for equalizing deflections of the front and rear sets of springs and displacements of the front and rear driving axle assembly when wheels are encountering irregular road surfaces.

I have found that it is of great advantage to connect or mount the rear driving axle assembly below the vehicle frame in such manner as to permit relative shifting of said assembly transversely of the chassis. To this end, the rear ends of springs 33 are connected with a slide bar forming part of one or more different assemblies hereinafter more fully referred to. One of the aforementioned assemblies may consist, as best shown for example in Figs. 6 to 8, inclusive, of a plate 34 having on its top side a rib 35 to which is secured in any suitable manner a rod 36 the ends of which are journaled in bearing brackets 37 that depend from opposite side members of the chassis frame. Disposed against the under side of the plate 34 and adapted for movement relative thereto and transversely of the vehicular frame, is a slide plate 38 to the under side of which, at its respective opposite end, are secured in any suitable manner and as indicated at 39, the aforementioned rear ends of the springs 33.

For lubricating the contiguous faces of the plates 34 and 38, plate 36 is provided with a series of Alemite fittings, or the like, 40.

Because of the spring equalizing mechanism and the sliding connection of the rear axle assembly just described, the slide connection members including plates 34 and 38 may rock on the shaft 36 when displacement of the axle assemblies take place. For example, if the wheels 23 are riding over a bump, spring 27 will be deflected upwardly causing, by a pull upon the chains 29, the springs 33 and rear driving axle assembly to be displaced downwardly. The displacement of the forward portion of springs 33 produces swinging action on the springs and slight rocking of the connection parts 34 and 38 take place upon the shaft 36.

On each side of the frame and disposed just forwardly of the connections between the forward ends of springs 33 and the equalizing chains, I prefer to provide depending abutment members A, as shown, in the form of heavy channel irons rigidly secured at their upper ends to the sides of the frame channel. Forward displacement of the rear driving axle assembly, which sometimes happens in starting movement of the vehicle, causes the spring connecting members 32 to abut against the members A, thereby preventing displacement of the slide connection plates 34 and 38, thus guarding against any pressure or strain upon the driving shaft or universal connections.

It will also be apparent that the torque tube 26 will serve to uniformly maintain the space between the wheels 24 and 23 and yet at the same time when the draft and trailer assembly is negotiating a turn wheels 24 and associated parts by reason of the connection of the springs 33 with the plate 38 will be permitted to slide either toward the right or left, thus permitting the turn to be negotiated more smoothly and without drag and wear on the tires.

Figures 9, 10:
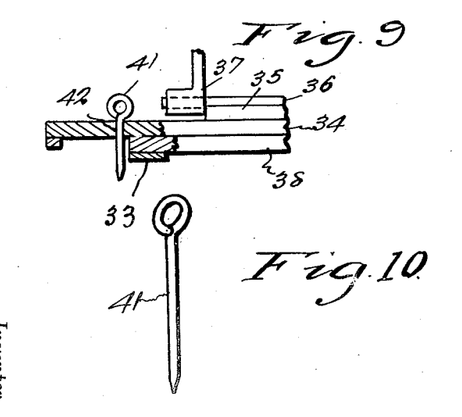

When it is desired to retain the plate 38 against sliding movement, as backing the vehicle, resort may be had to stop pins or the like, 41 which may be readily inserted downwardly through openings 42 provided therefor in the plate 34 in a manner best shown in Fig. 9.

Figures 4, 5, 6, 7, 8:
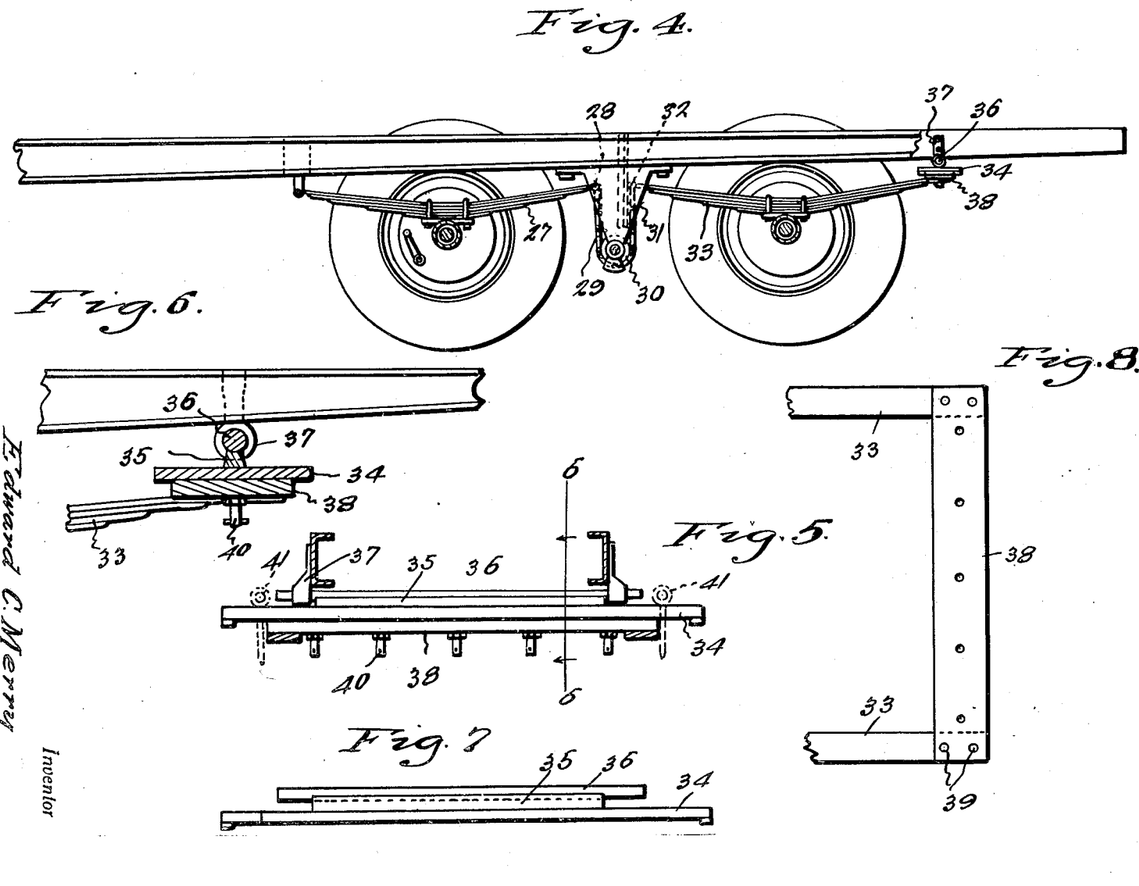
Figure 19:
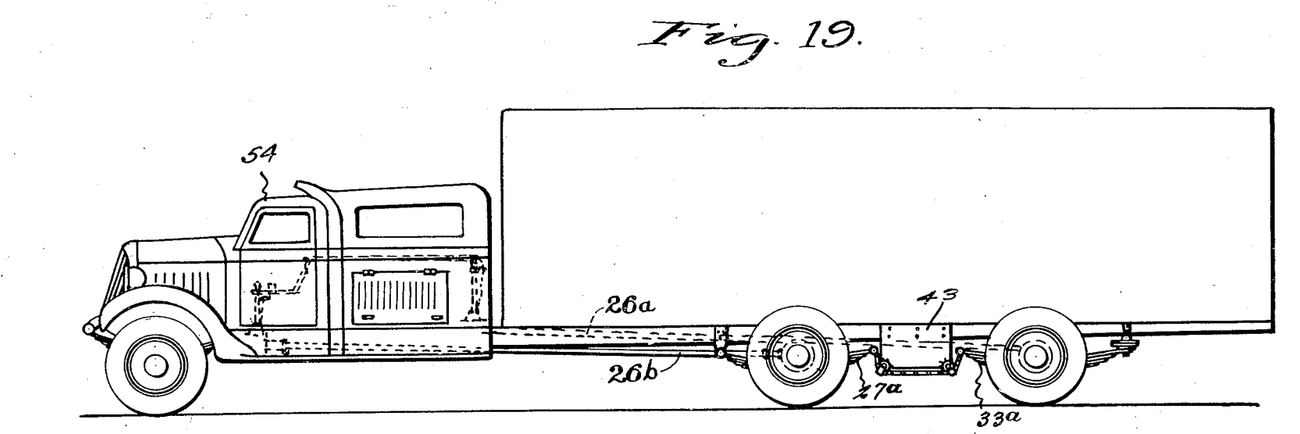
Fig. 19 is a view in elevaion showing the relative positions of the drive connections between the transmissions and differentials in a different arrangement of vehicular construction.
Figure 21:
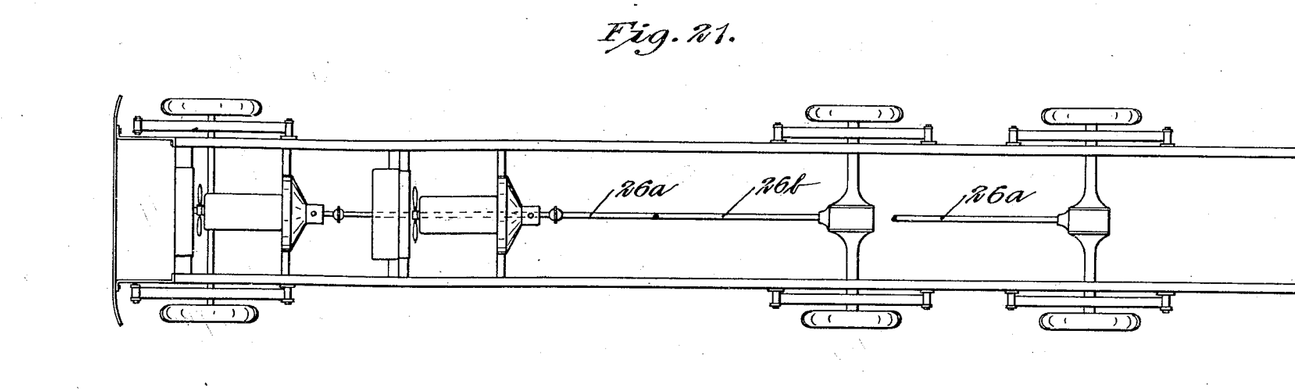
Fig. 21 is a more or less diagrammatical plan view showing the motor arrangement and rear end connections.

In Fig. 19 is illustrated an application of the invention to a motor truck, there being illustrated the entire assembly shown for example in Fig. 2 as well as the entire assembly shown for example in Fig. 5 so that further detail explanations of these assemblies as used in the manner suggested in Fig. 19 is believed unnecessary.

However, in Fig. 19 is illustrated a slightly modified form of chain and sprocket connection between the springs 27a and 33a. Thus as shown in Fig. 19 and also in Figs. 15 and 16, opposite sides of the chassis frame have depending therefrom relatively broad plates or hanger brackets 43 which, adjacent the lower corners thereof, are provided with guides 44 for the sprocket chains 29 and which chain is trained over sprockets 45 suitably journaled within the guide 44, as shown.

In connection with the above, it will be understood, however, that if desired, the identical same connection between springs 27a and 33a may be resorted to and this is clearly suggested in Fig. 4.

In Fig. 19 is suggested the idea of having the torque tube 26a corresponding to the torque tube 26 in Fig. 1 extending to the rearwardmost pair of wheels and a torque tube 26b connecting the forward motor to the forward axle assembly. In other words the torque tube leads from the rear motor to the rearmost tandem axles in each embodiment. In the embodiment shown in Fig. 19, however, the tandem axles are placed farther back than in Fig. 1. The only difference between the two tubes is in their length. When a dual driving axle construction is not desired, resort may be had to the assembly suggested in Figs. 15 and 16, to connect the rear axle assembly with the frame and to insure the maintaining of the rearwardmost wheels against shifting either forwardly or rearwardly. Thus for this purpose and as shown in Figs. 15 and 16, resort may be had to a rod 46 which, at one end, is clamped at 47 to the axle now provided for the rearwardmost wheel 24a and at its forward end rod 46 is provided with a ball head 48 suitably engaged in a two-part socket structure 49 mounted on a heavy plate 50 which extends transversely of the vehicle between the plates 43, all of which is best shown in Fig. 16.

Figure 15:
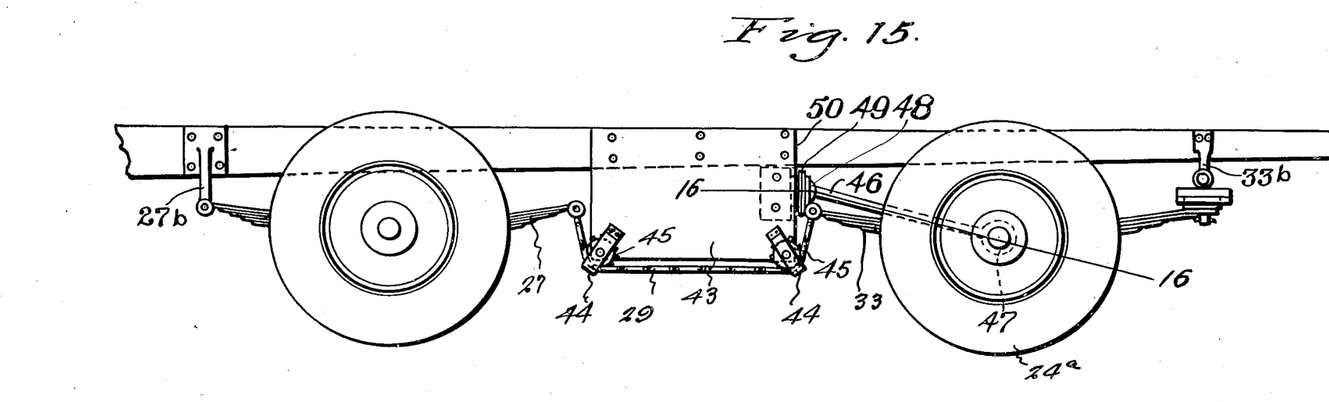
Fig. 15 is a view illustrating a modified form of the invention.
Figure 16:
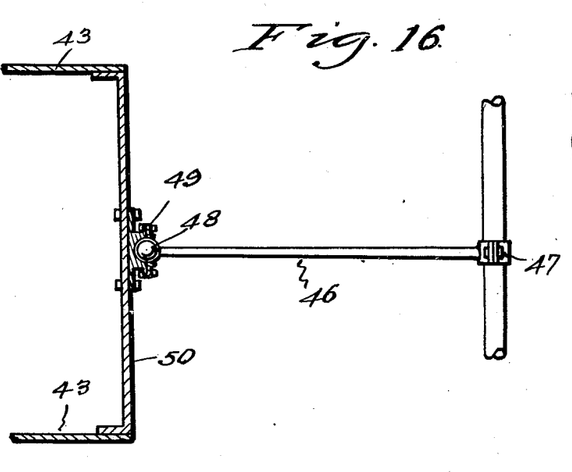
Fig. 16 is a detail sectional view taken substantially on the line 16—16 of Fig. 15.

The heavy plate 50 preferably is rigidly secured to the shaft which acts as the pivot for chain sprockets 30 and extends upwardly from the shaft to the underside of the vehicle frame, and said plate or partition 50 extends completely across the frame and may have turned vertical edges welded, or otherwise secured to the side plates 43, if the construction shown in Figs. 15 and 16 is utilized.

Figure 18:
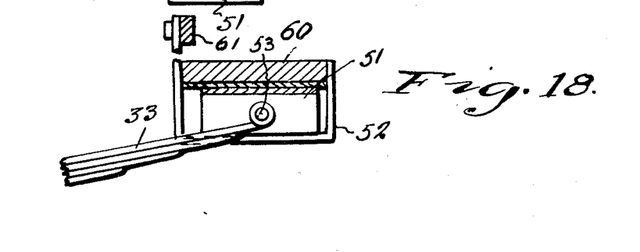
Fig. 18 is a detail elevational view showing the manner of connecting the vehicular wheel spring with the slide plate of the assembly shown in Fig. 17.

In place of the mechanism shown in Fig. 5 for connecting the rear driving axle assembly with the vehicle frame to permit limited sliding of said assembly transversely of the chassis, other suitable means may be utilized, such as, for example, the construction illustrated in Figs. 17 and 18. In this construction, a horizontal plate 60 is fixed to the underside of the frame channels and has disposed therebeneath a slide plate 51 (see Figs. 17 and 18). Slide plate 51 has projecting from the opposite side edges thereof, pivot bolts 53 which are connected with the rear ends of the springs 33.

To prevent endwise displacement or disconnection of the cooperating sliding plates 51 and 60 and to prevent upward displacement through bouncing action, I provide a heavy depending strap 52 preferably of J shape, the upper end of which is rigidly attached to a cross member 61 of the vehicle frame. The stem portion of the J strap is disposed rearwardly of the plates 51 and 60 and acts as a stop to prevent displacement longitudinally of the chassis while the turned lower portion of the strap underlies the plate 51 and prevents any substantial separation of plates 51 and 60, due to bouncing action. The outer and slightly upturned tip of the J strap is preferably secured to the plate 60 by suitable connection means. The strap 52 which is preferably disposed centrally of the slide plates 51 and 60, therefore acts as a keeper and abutment member for the sliding parts. The construction just described permits relatively swinging of the rear driving axle assembly to the chassis frame through the pivotal connection of the pivot bolts 53 with the rear end of springs 33.

Also, in accordance with the present invention, I provide for a proper cooling of the auxiliary motor 6 by interposing between the cab 54 of the draft vehicle and the motor 6, air collection and deflection means which will serve to direct air downwardly and rearwardly through the core of the radiator of the rear motor 6.

As shown, such means comprises a large vertically disposed scoop 55 (see Figs. 1, 13 and 14) having a forwardly turned flange 57 which, as shown, overhangs to some extent, the top of the truck cab and is spaced therefrom, said scoop having also forwardly turned side flanges 56 disposed some distance outwardly of the side walls of the cab. The large back and vertical portion of scoop 55 is provided with a large aperture registering with the front of the radiator. As the vehicle moves forwardly, air will be collected by the scoop and deflected with considerable force through the core of the radiator to cool the motor.

From the foregoing description it will be seen that, in all forms of my invention, a highly efficient distribution of weight and load is effected by my tandem wheel and axle assemblies in cooperation with their connections with the frame and in cooperation with the spring equalizing mechanism utilized. The weight and load supported by the wheel assemblies connected with wheels 23 and 24 are very uniformly distributed upon the wheels disposed in tandem by a three-point suspension or support at each side of the chassis. That is, the front end of spring 27 of the forward wheel assembly is pivotally connected at 27a with the vehicle frame while the rear end of spring 33 of the rear wheel assembly is pivotally connected to the frame at a point 33a spaced considerably from the first mentioned connection of the front springs. The third point of suspension is on the equalizing chain sprocket 30, one of which is disposed at each side of the vehicle, support being transmitted through the bolsters or other depending means which connect the sprocket shaft with the underside of the chassis frame, and uniform distribution of weight and load is assured by the equalizing connections between the rear ends of the front springs 27 and the forward ends of the rear springs 33 of the tandem axle assembly. The efficient load distribution functions are obtained in my improved vehicle whether one, two or more of the tandem axle assemblies are driven, or not. While I have illustrated tandem axle assemblies having only two sets of wheels, it will of course be apparent that three or more sets of wheels disposed in tandem may be utilized with even greater weight distribution effect for larger vehicles and for heavier loads. In going over irregular road surfaces, the proportions of the load distributed upon the several wheels of my tandem assembly will vary but very slightly and jolting and tilting of the load is minimized.

With my construction I have described, the turning of the vehicle in rounding of curves in travel is greatly facilitated by my mechanism which connects the rear of the tandem axle assembly with the rear portion of the frame to permit transverse shifting of the frame relative to the axle assembly. Thus, in making a turn, when the front steering wheels of the foundation truck are turned to follow a curved path, the rear of the chassis frame shifts or swings relatively to the tandem axle assembly, my slide connections permitting such shifting action. Lateral dragging of the wheels and lateral strains upon the axle assemblies is thus substantially eliminated with the result that tires, springs and axle assembly parts will withstand considerably more wear than in the case of other tandem driven motor vehicle construction.

It further will be seen that with my axle assembly equalizing construction and mechanism for uniformly distributing the load, that the front and rear wheels of the tandem can be and are placed a considerable distance apart, which substantially eliminates heating of the tires, as well as tire chopping from gravel and materials thrown upon the rear tire treads by the front wheels of the tandem. In most commercial structures employing tandem axle assemblies, such heating and tire chopping has been found very objectionable, due to the necessary proximity of the front and rear sets of tires.

The advantages derived from mounting an additional motor to the rear of the usual motor, in tandem relation, are important. For one thing, it permits the construction of a multi-motored vehicle nearly entirely from standard parts. There is no need for special rear axle constructions such as are necesary when motors are disposed laterally of each other at the sides of the frame and are connected to the driving axles in off-center arrangement. Thus servicing and repair, as well as initial manufacturing costs, are not increased as they are in some of the more unusual types of construction. In addition, the weight of the motors and driving connections is centrally positioned in the same manner as in the ordinary type of automotive vehicle design.

It has been found that trucks constructed according to my invention, even though made up of relatively light motor units, are capable of withstanding the strains imposed by heavy loads even in mountainous territory. When compared with many of the large motor vehicles in use today it is obvious that the original assembly can be constructed at a comparatively lower cost and the maintenance cost will be relatively low because of the fact that smaller and consequently cheaper replacement parts can be secured. Other operating costs such as those for fuel and lubrication are also remarkably less than in other structures which are capable of doing the same work and produce substantially the same power although the power plants themselves are materially larger. With my construction, the two complete and independent power sources and driving axle assemblies enable the vehicle to be driven even though one of the units, or any part of one of the driving axle assemblies or driving connections, is, for any reason, damaged or rendered inoperative. In traveling with light loads, additional economy is effected with my structure since it is only necessary in such instances to operate one of the power units.

It will of course be understood that various changes may be made in the form, details, arrangement and proportion of the parts without departing from the scope of my invention.

What is claimed is:—

1. A motor vehicle comprising an elongated frame having a rear pay load carrying portion, tandem wheel assemblies supporting the rearward portions of said frame, said wheel assemblies including at least a pair of driving axles each driving a pair of wheels and operably connected to said frame, a first internal combustion engine carried by said frame at the front of the vehicle and projecting upwardly above said frame, a second internal combustion engine carried by said frame at the fore part of the vehicle behind said first engine and projecting upwardly above said frame, both of said engines being located forward of the pay load carrying portion of the frame, a first drive shaft below said frame connected to and running directly rearwardly from said first engine to one of said driving axles and operatively connected therewith and a second drive shaft below said frame connected to and running directly rearwardly from said second engine to the other of said driving axles and operatively connected therewith.

2. A motor vehicle comprising an elongated frame, a driver's cab mounted on said frame at the forepart thereof, tandem wheel assemblies supporting the rearward portions of said frame, said frame having a rear pay load carrying portion, said wheel assemblies including at least a pair of driving axles each driving a pair of wheels and operably connected to said frame, a first internal combustion engine carried by said frame at the front of the vehicle and projecting upwardly above said frame forward of the driver's cab, a second internal combustion engine carried by said frame at the forepart of the vehicle directly behind said driver's cab and projecting upwardly above said frame, both of said engines being located forward of the pay load carrying portion of the frame, a first drive shaft below said frame connected to and running directly rearwardly from said first engine to one of said driving axles and operatively connected therewith and a second drive shaft below said frame connected to and running directly rearwardly from said second engine to the other of said driving axles and operatively connected therewith.

3. A motor vehicle comprising an elongated frame having a rear pay load carrying portion, tandem rear wheel assemblies supporting the rear portions of said frame, said wheel assemblies including at least a pair of driving axles one located behind the other, each driving a pair of wheels and operatively connected to the frame, a first internal combustion engine carried by said frame at the front of the vehicle and projecting upwardly above said frame, a second internal combustion engine carried by said frame at the forepart of the vehicle behind said first engine and projecting upwardly above said frame, both of said engines being located forward of the pay load carrying portion of the frame, a first drive shaft below said frame connected to and running directly rearwardly from said first engine to the forward driving axle and operatively connected therewith and a second drive shaft below said frame connected to and running directly rearwardly from said second engine to the more rearwardly spaced driving axle and operatively connected therewith, said two drive shafts overlapping one another through portions of their length.

4. The structure defined in claim 3, and said second drive shaft passing over said forward driving axle.

5. The structure defined in claim 3, each of said engines having selective transmissions and means for simultaneously shifting both transmissions.

EDWARD C. MERRY.